United States Patent [19]

Stahl

[11] Patent Number: 4,950,407

[45] Date of Patent: Aug. 21, 1990

[54] METHOD FOR THE TREATMENT OF SEWAGE

[75] Inventor: Natahn Stahl, Pardes Hana, Israel

[73] Assignee: Amercian Israeli Paper Mills Ltd., Hedera, Israel

[21] Appl. No.: 311,850

[22] Filed: Feb. 17, 1989

[51] Int. Cl.$^5$ ................................................ C02F 3/12
[52] U.S. Cl. ..................................... 210/626; 210/631
[58] Field of Search ............... 210/610, 620, 626, 631, 210/702, 906, 697, 609

[56] References Cited

U.S. PATENT DOCUMENTS 4,671,882 6/1987 Douglas et al. ..................... 210/720

OTHER PUBLICATIONS

"Hawley's Condensed Chemical Dictionary", 11th Edition, 1989, p. 1111.

*Primary Examiner*—Randall E. Deck
*Attorney, Agent, or Firm*—Birch, Stewart, Kolasch & Birch

[57] ABSTRACT

The present invention relates to a method for the treatment of sewage in which the sewage is supplied to an aeration basin and treated therein by a biomass of aerobic microorganisms with simultaneous supply of air and addition of calcium phosphate. Thereafter, the mixture of the biomass and the deteriorations being the substrate of said microorganisms (M. L. S. S.) is forwarded to a clarifier, wherein the biomass and the effluent are separated from each other and withdrawn separately. The calcium super phosphate is advantageously added in an amount of 0.35 mg/g–2 mg/g M. L. S. S. as a 10% aqueous slurry.

3 Claims, 1 Drawing Sheet

METHOD FOR THE TREATMENT OF SEWAGE

FIELD OF THE INVENTION

The present invention relates to an improved method for the treatment of sewage by the so called activated sludge method.

BACKGROUND OF THE INVENTION

Conventional plants for the treatment of sewage operated by the activated sludge method operate as follows:

Sewage is supplied in the plant to an aeration basin. Deteriorated products are removed in said basin by a biomass of aerobic microorganisms. These deteriorated products serve as a substrate for the microorganisms. Aerators are present in said basin in order to forward air to the aerobic biomass and to ascertain that said biomass is in a suspended position in the aeration basin. The mixture of biomass and said substrate in the suspended position is called mix liquid suspended solids (M.L.S.S.). The M.L.S.S. is forwarded from the aeration basin to a clarifier wherein the effluent is separated from the sludge. The sludge precipitates and is sucked from the bottom of the clarifier and partly (about 93%) recycled to the entrance of the raw sewage. The effluent leaves the clarifier at its top and is forwarded for agricultural use.

A certain amount of the sludge precipitated at the clarifier leaves the system as excess sludge and is led towards drying beds after it has been subjected to a thickening process in a flotation device in order to enable the biomass in the system to be renewed.

This process will be called hereinafter a method for the treatment of sewage (as herein defined).

The amount of biomass in the plant is proportional to the bio degradable matter which is present in the raw sewage and the possibility to provide air (oxygen) to the plant.

The main drawback of said conventional activated sludge plant is that the biomass in the clarifier does not precipitate well and thus large amounts of untreated sewage i.e., bulking sludge are obtained.

One of the most important indices of the precipitation property of the M.L.S.S. in the clarifier is called SVI which is defined by the following equation:

$$SVI = \frac{\text{volume of settling sludge of one liter } M.L.S.S. \text{ at } \frac{1}{2} \text{ hour}}{\text{g/l of } M.L.S.S.}$$

or, in other words, SVI is equal to the volume of 1 gram of M.L.S.S. after precipitation of ½ hour. The SVI under regular conditions in a conventional activated sludge plant is, under certain circumstances, 100-150 SVI, but under special circumstances, 200 SVI.

As the result of said drawback, the operation capability of the activated sludge plant for the treatment of sewages is significantly restricted, thus when SVI is high the separation capability of sludge/effluent in the clarifier is low and therefore the amount of biomass which can be retained in the aeration basin is low. Thus, in case that the amount of organic material is high, there is not enough biomass to decompose it and therefore, together with the excess sludge, there remains living material which has not been subjected to aerobic decomposition. Thus, there begins uncontrolled anaerobic fermentation, which causes unpleasant smells.

A further problem is the "fleeing" of the sludge with the effluent, which spoils the quality of the effluent as the result of bad precipitation of the biomass.

As a result of said drawbacks, one has to reduce the amount of sewage being treated in the system.

There are various means to improve said known methods, inter alia, the following ones:
1. To improve the mixing in the aeration basin in order to avoid unaerobic pockets;
2. to facilitate the movement of the return sludge;
3. to try to improve the precipitation of the biomass;
4. to facilitate the removal of the excess sludge However, all said solutions are not entirely satisfactory and therefore very often one has to reduce the amount of sewage which has to be treated and/or to enlarge the plant, which is very costly. However, as it is readily understood, said solutions are very unsatisfactory.

It has therefore been desirable to find a solution which would improve the method, i.e. would reduce the SVI and thus enable the treatment of a larger amount of sewage.

DESCRIPTION OF THE PREFERRED EMBODIMENT

Figure 1:
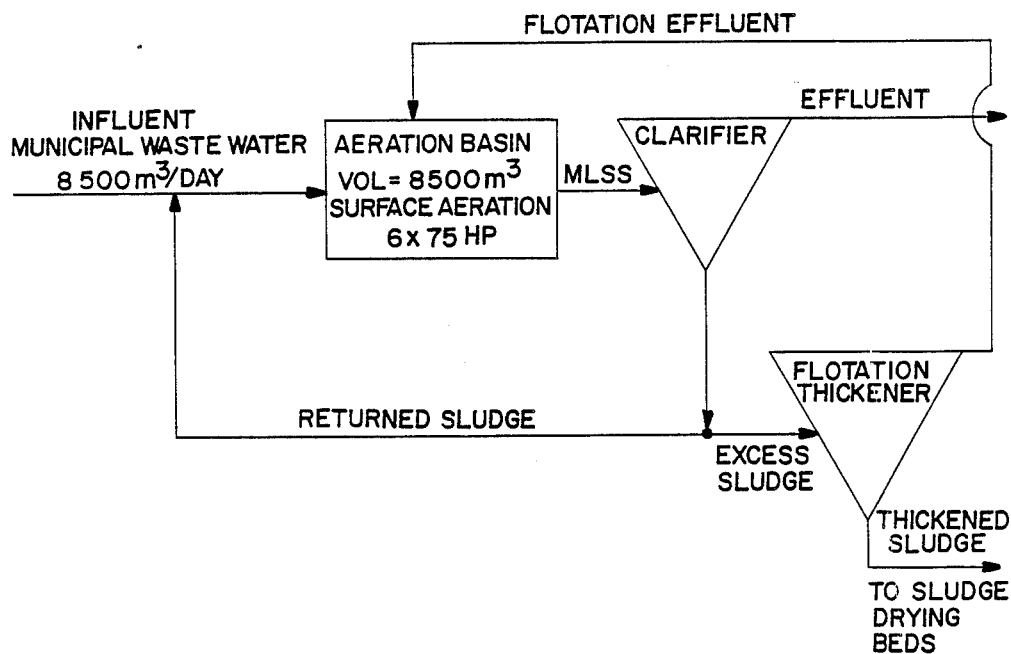
FIG. 1 is an example of a sewage plant treating process.

It has now surprisingly been found that by adding calcium super phosphate to the aeration basin, said solution has been achieved. Calcium super phosphate has the following formula:

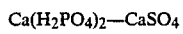

$Ca(H_2PO_4)_2—CaSO_4$

The present invention thus consists in an improved method for the treatment of sewage by the so-called activated sludge method (as herein defined) in which a calcium super phosphate is added to the aerobic basin.

The preferred amount of super phosphate being added is 0.35 mg/g to 2 mg/g of M.L.S.S. in the clarifier. The calcium super phosphate has preferably the following composition:

| | |
|---|---|
| $P_2O_5$ | 2590 |
| (as P | 11%) |
| Ca | 22% |
| S | 11% |

Said super phosphate is preferably added in the form of a slurry, preferably of 10%. Said slurry is advantageously added with vigorous stirring. Said addition reduces the SVI to a great extent and thus enables the treatment of a larger amount of sewage.

It was tried to add another phosphate, namely potassium phosphate, to the aeration basin but the SVI could not be reduced. Moreover, also, a test was made by adding a certain amount of chloride, which was also to no avail.

The present invention will now be illustrated with reference to the accompanying drawings, without being limited by same.

EXAMPLE 1

In winter 1987, a plant having a capacity of 4,028 m³ per day showed an average SVI of 424. When adding 1.1 mg calcium super phosphate per 1 g of M.L.S.S., there was a reduction of the SVI from 420 to 185. Said plant was operated under said conditions from the Apr. 11, 1987 to the Apr. 22, 1987. The moment the addition of the super phosphate was interrupted, the SVI returned to the above level, namely 424. Comparative tests were performed with Chlorine. The results are shown in Table I:

TABLE I

| Period | SVI | Treatment Average/ Day | Concentration of M.L.S.S. In g/l | Average Amount of Sewage m³/day |
|---|---|---|---|---|
| Fr. 23.3.87 To 29.3.87 | 400–450 | Without Treatment | 2.0 | 4028 |
| Fr 30.3.87 To 10.4.87 | 360–450 | Addition of Cl₂ 2.5 mg Cl₂/g M.L.S.S. | 2.1 | 3820 |
| Fr 11.4.87 To 22.4.87 | 185 | 2.8 mg Cl₂/g M.L.S.S. 1.3 mg CaP₂O₅ + CaSO4/g M.L.S.S. as P | 1.8 | 4342 |
| Fr 23.4.87 To 8.5.88 | 470 | 3.4 mg Cl₂/ g/M.L.S.S. | 1.6 | 3828 |

EXAMPLE 2

In March, 1988, there was performed a further test in a plant where the SVI was 250. After adding 0.35–1.2 mg. of super phosphate per 1 g of M.L.S.S., said level was reduced to 169. Said test was continued for one month.

Thus, the entire amount of sewage, namely being 7,570 m³, could be treated in comparison with that previously being, namely 4,000 m³.

Comparative tests were performed with potassium phosphate and the results are shown in Table II.

TABLE II

| Period | SVI | Treatment Average/ day | M.L.S.S. In g/l | Average Amount of Sewage m³/day |
|---|---|---|---|---|
| 21.1.88– 26.1.88 | 291 | No Treatment | 2.2 | 6170 |
| 27.1.88– 6.2.88 | 270 | K₂O + H₃PO₄ 1.2 mg/g M.L.S.S. as P | 2.0 | 6525 |
| 7.2.88 27.2.88 | 264 | No Treatment | 2 | 6525 |
| 28.2.88– | 169 | CaP₂O₅ + CaSO₄ | 2.4 | 7570 |
| 28.3.88 | | 0.35 mg - 1.2 mg/ M.L.S.S. as P | | |
| 29.3.88– 5.4.88 | 225 | No Treatment | 3 | 7627 |

I claim:

1. A process for the treatment of sewage by the activated sludge method comprising the steps of:
   (a) supplying the sewage to an aeration basin in a sewage treatment plant;
   (b) treating the sewage in said aeration basin with a biomass of microorganisms while simultaneously supplying air to said sewage;
   (c) forwarding the mixture of sewage and biomass to a clarifier;
   (d) separating the biomass from effluent formed in the clarifier; and
   (e) removing the separated biomass from said effluent; wherein the improvement comprises the addition of calcium superphosphate to the aeration basin in step (b).

2. A process according to claim 1, wherein the amount of calcium superphosphate is 0.35 mg/g–2 mg/g mix liquid suspended solids.

3. A process according to claim 1 or 2, wherein the calcium superphosphate is added as a 10% aqueous slurry.

* * * * *